No. 857,301. PATENTED JUNE 18, 1907.
O. C. PATTON.
AUTOMATIC WEIGHING MACHINE.
APPLICATION FILED JUNE 18, 1906.
3 SHEETS—SHEET 3.
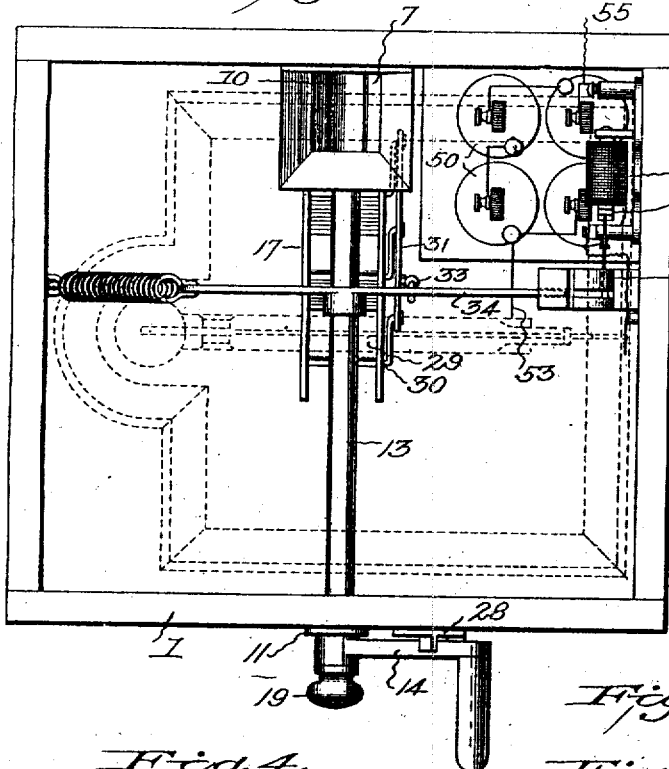
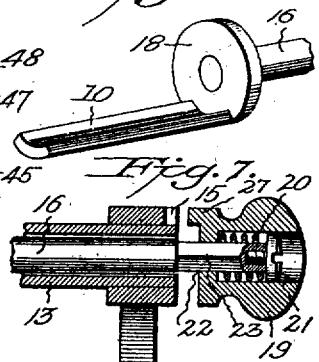
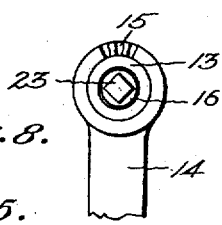
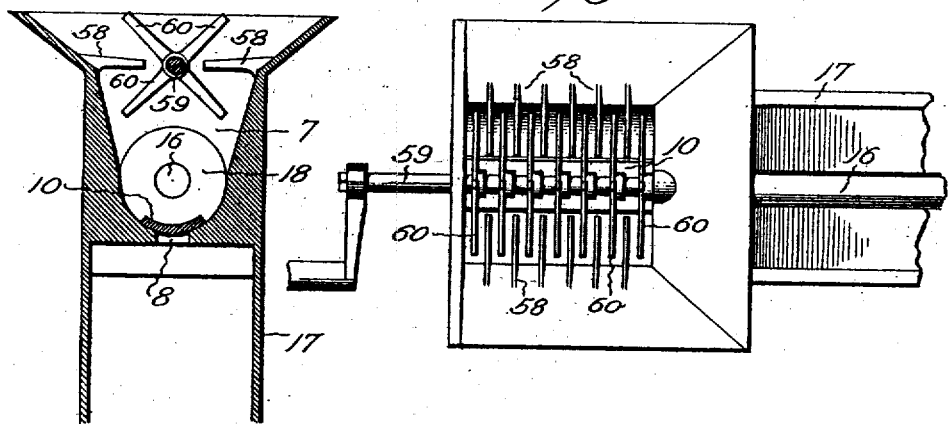
Witnesses:
G. Sargent Elliott.
John J. A. Miller
Inventor:
By Oliver C. Patton.
H. S. Bailey, Attorney.

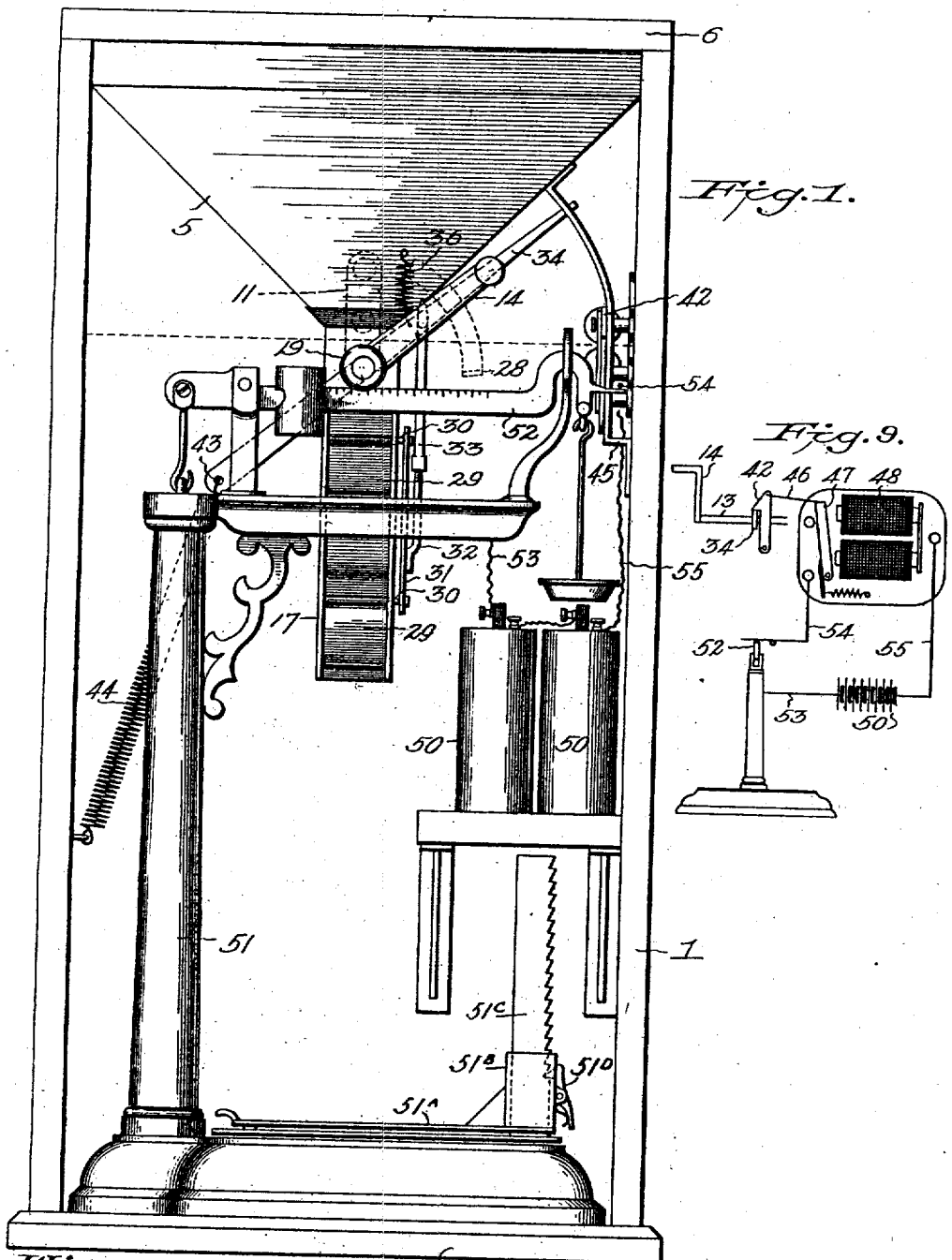

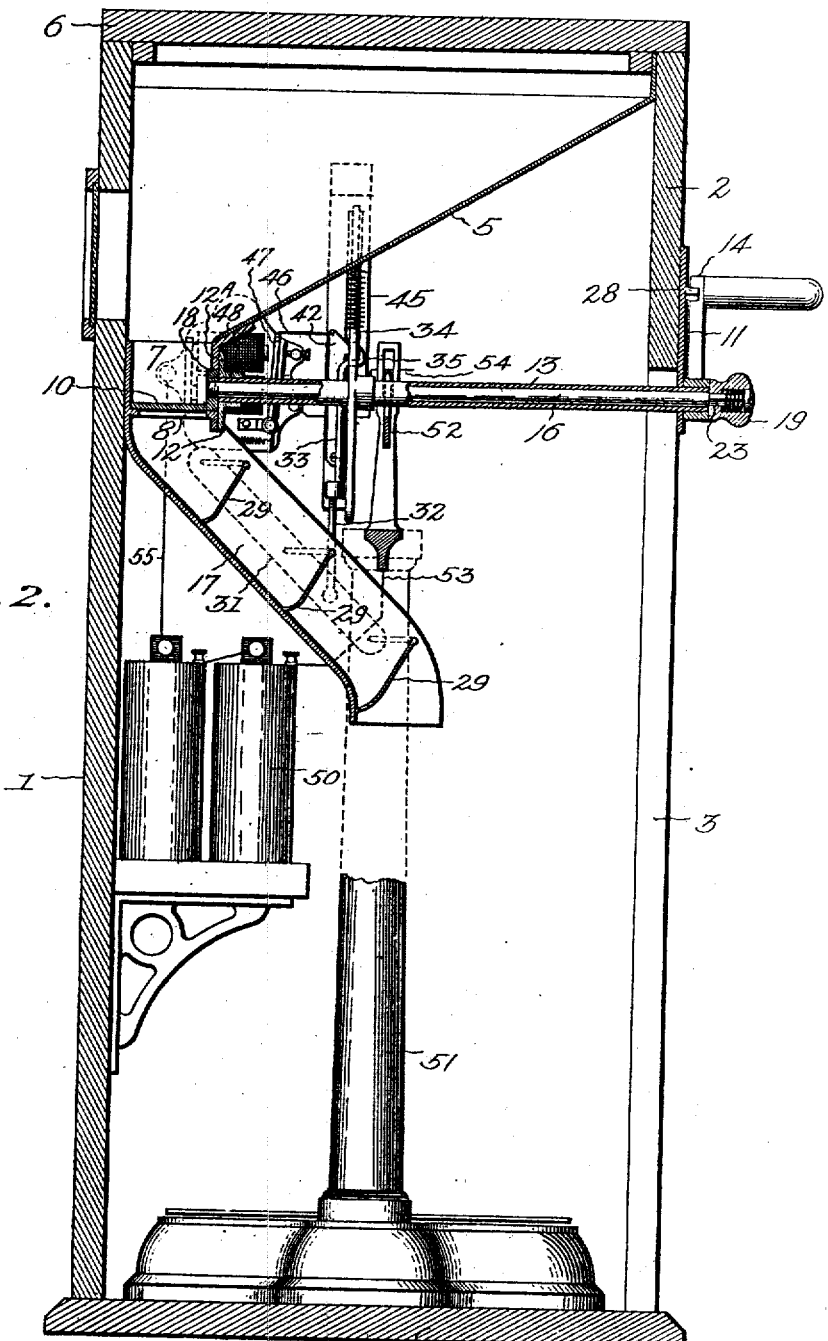

UNITED STATES PATENT OFFICE.

OLIVER C. PATTON, OF DENVER, COLORADO, ASSIGNOR, BY DIRECT AND MESNE ASSIGNMENTS, OF ONE-THIRD TO FRED L. JONES AND ONE-THIRD TO CLINTON A. DOUGLASS, OF DENVER, COLORADO, AND ONE-THIRD TO ANDREW F. HARRIS, OF DOLORES, COLORADO.

AUTOMATIC WEIGHING-MACHINE.

No. 857,301.     Specification of Letters Patent.     Patented June 18, 1907.

Application filed June 18, 1906. Serial No. 322,271.

*To all whom it may concern:*

Be it known that I, OLIVER C. PATTON, a citizen of the United States of America, residing at the city and county of Denver and State of Colorado, have invented a new and useful Automatic Weighing-Machine, of which the following is a specification.

My invention relates to improvements in automatic weighing machines, and the objects of my invention are: First, to provide an electrically operating accurately weighing and instantaneous supply cut-off automatic weighing machine. Second, to provide an electrical cut-off automatic weighing machine. And third, to provide a simple, positive, and reliable automatic working machine. I attain these objects by the mechanism illustrated in the accompanying drawings, in which:

Figure 1, is a front elevation of my improved, automatic weighing device. Fig. 2, is a central, vertical, sectional view of the same. Fig. 3, is a plan view thereof, the cover and hopper being removed. Fig. 4, is a vertical, transverse, sectional view through the upper end of the discharge chute, showing mechanism for disintegrating lumpy sugar or other materials which are liable to clog. Fig. 5, is a plan view of the same. Fig. 6, is a perspective view of the valve for controlling the discharge opening of the chute. Fig. 7, is a sectional view of the valve stem adjusting knob. Fig. 8, is a front view of the end of the valve stem crank, showing the notches engaged by the knob. And Fig. 9, is a view in diagram. illustrating the electric circuit, and its connection with the scale beam.

Similar letters of reference refer to similar parts throughout the several views.

Referring to the drawings, the numeral 1, designates the casing of my weighing machine, which consists of a rectangular box made of wood or of metal or of any other suitable material. A portion of one side 2, of the casing, which I term the front side, is cut away to form an opening 3, into the box. This opening extends from even with the inside bottom or floor 4, of the box, to within a short distance of its top. In the top of the casing I form a hopper 5, which may be of any capacity desired, but where the weighing device is used for sugars and such articles I prefer to make it of a size to hold about one hundred pounds. The top edge of this hopper is preferably placed a short space below the top of the casing, and a cover 6, is arranged to fit over it and the top of the casing. This hopper slopes from three sides of the box to a small oblong discharge opening at its center, which discharges into the chamber 7 of a chute to be presently described, the bottom of which chamber has an opening 8, above which is located a valve 10, which is operated from the outside of the casing, and I preferably arrange this valve in the following manner: To the front of the casing I secure a bearing bracket 11, and to the front wall of the chamber 7 I secure a plate 12, having a bearing hub 12A, and in these two bearings I rotatably journal a tubular shaft 13, the outer end of which extends slightly beyond the outer bearing and is provided with a crank handle 14, the hub of which is formed with a semicircular row of notches 15, which are arranged radially therein. Inside of this tubular shaft I rotatably fit a valve stem 16, which is preferably a solid valve stem, the inner end of which carries the valve 10, that controls the discharge aperture 8, of the chamber 7.

A number of different types of valves may be used to control the feed of the hopper, but I preferably employ a rotary valve, and preferably construct it as follows: Below the hopper I form a discharge chute 17, having the chamber 7 at its upper end, and the top of this chamber is flared and is connected to the under-side of the hopper. The opposite end of the chute extends at an outward and downward angle of preferably about forty-five degrees, toward the open side of the casing. The valve comprises an end disk 18, to which the semicircular valve 10, is integrally secured. This valve fits closely but rotatively in the chamber 7, and it is connected integrally to the valve stem 14, which extends through and beyond the tubular shaft far enough to receive a finger knob 19, and a coiled spring 20. The spring rests between the head of a screw 21, that is secured at the end of the valve stem, and a wall 22 at the inner end of the knob, and this knob has a sliding movement on a square portion 23, formed on the stem, its inner face being adapted to abut against the hub of the crank 14, and a tooth 27 is secured to the face of the knob, that is adapted to fit in the notches in the hub of the crank. The pin is held normally in one of the notches, and the face of the knob is normally held against the end of the tubular shaft by the expansive tension of the spring 20. The crank 14 has an oscillating movement, which is defined by a stop 28, and the tubular shaft, the valve stem, and the valve are partially rotated by the crank to open and close the valve, as will be fully explained hereinafter.

The discharge spout 17, is a trough-shaped chute, and it is provided with a plurality of swinging gates 29, which are mounted on stems 30, that are pivotally mounted in the side of the chute. These stems extend beyond the sides of the chute, and each stem is bent at right angles and extends along the side of the chute, and is then again bent outward so that a crank portion is formed on it, the end of which is pivotally connected to a lever 31, to which one end of a rod 32, is pivotally attached, the opposite end of this rod being threaded to the lower end of a rod 33. The upper end of the rod 33 is pivotally secured to a lever 34, preferably by giving the end of the rod a crank-shaped bend 35, as shown in Fig. 2. I preferably connect the rod in this manner, as it dispenses with the use of a bolt and nut, but if desired a bolt and nut may be used. To the lever 34, adjacent to its connection with the rod 33, is secured one end of a spring 36, the opposite end of which is secured to the hopper. The lever 34, I term the valve lock lever, and it is secured intermediate of its ends to the tubular shaft 13, and one end extends to the opposite side of the casing, where it engages an electrically controlled latch 42. The opposite end of the lock lever 34, extends to near the adjacent side of the casing, and has an aperture 43, to which one end of a contraction spring 44, is connected, the opposite end of which is secured to the side of the casing. The electrically controlled latch 42, is pivotally connected by a screw to a supporting bracket 45, the upper portion of which is slotted to receive the forward end of the lever 34. The slotted portion of the bracket is preferably curved to conform to the arc through which the end of the lever travels, and the slot will prevent lateral movement of the lever. The upper end of the bracket is preferably secured to the hopper as shown. The latch is positioned so that its hook lies across the slot in the path of the valve lock-lever, and is moved back by the end of the lock lever, as it is swung down, and then hooks over the lever and holds it down, this movement of the lever causing the valve 10 to turn, so as to uncover the opening 8, in the chamber 7. The latch is operated to release the lever by means of a wire 46, which is connected at one end to the latch and extends to and is secured at its opposite end to the upper or free end of the armature 47, of a magnet 48. The armature of the magnet normally stands a short distance from the magnet, and the latch is held by the wire in a locked position; consequently when the lock lever is moved down it engages the sloping upper edge of the latch, and moves it and the wire and the armature of the magnet back far enough to allow the lever to pass below the end of the hook of the latch, when the spring of the armature forces the wire and latch forward, and the hook of the latch moves over the top edge of and locks the lever down. The downward swinging movement of the lock lever partially rotates the tubular shaft, and the valve stem, and opens the valve, which is held open by the automatic locking of the lever to the electrically controlled latch. The magnets are operatively connected to a group of electrically charged cells 50. Inside of the casing 1 place a weighing scale 51, which may be of any suitable kind or character, that is provided with a weighing beam 52. I preferably employ a scale of the platform type, which is secured to the floor of the casing, and this scale is connected by a wire 53 to the binding post of one of the batteries, and I arrange the beam of the scale so that when it oscillates up and down in weighing merchandise it will engage a contact terminal wire or piece of metal 54, that is connected to a binding post of the magnet, the magnet and batteries being connected by a wire 55. Thus when the scale beam contacts with the wire 54, a circuit is established through the batteries, scale, and magnet, and the armature is retracted, drawing with it the latch 42, which releases the lever 34, which is thrown up by the springs 36 and 44, and these springs being located on opposite sides of the pivotal point of the lever will each counteract the tendency of the other to give to the lever an oscillating motion after it has escaped the latch 42. A suitable cutout (not shown) may be employed to break the circuit, after the latch has released the arm 34.

In connection with Fig. 1, I have shown an adjustable platform 51A, which has a slotted post 51B, at one end, through which passes an upright rock bar 51C, which is secured to the platform of the scale. The slotted post has a spring dog 51D, which engages the teeth of the rock bar 51C. Thus the platform 51A may be raised to any desired height, for bags of different lengths or capacities, so that the mouth of any sized bag may stand immediately beneath the discharge end of the chute.

The operation is as follows: The material to be weighed, for instance sugar, for which commodity my scale has been especially designed, is placed in the hopper and a sack is placed on the scale around the discharge end of the spout 17. The operator then grasps the crank of the tubular shaft 13, and turns it down to the right to the stop 28, which moves the free end of the lock lever down into engagement with the latch, and as the tubular shaft rotates it carries with it the valve stem, which is locked to it by the pin 27 of knob 19, and this partial rotative movement rotates the valve 10 and uncovers the opening in the bottom of the chamber 7, and the sugar then runs into the chute. The rotative movement of the lock lever presses down on the rod 32, 33, which depresses the lever 31, and opens the gate valves 29, and allows the sugar to escape through the chute and discharge into the sack placed on the scale. The scale is always set to weigh the amount desired, and the instant that weight of sugar has run out of the hopper into the sack the beam of the scale rises and strikes the circuit rod or wire 54, and completes the electric circuit from the cells through the magnet, and the beam of the scale, and the armature is instantly attracted to the magnet and pulls the latch back, releasing the lock lever, which instantly flies upward through the action of the two contraction springs 36 and 44, which at the same time turn back the tubular shaft 13, and the valve stem, and close the valve as well as the gate valves in the chute, thus instantly and effectually stopping the flow of sugar, which is cut-off at the end of the chute within the sack; the two springs of the lock lever and the lever impart a positive firm closing joint movement to the gate valves, while the threaded connection of the rods 32 and 33 permits adjustment of the gate valve stems that enables a tight joint to be maintained between the edges of these valves and the floor of the chute. The instant the lock lever is released by the magnet and latch, its springs jerk it up and close the valve and the electric circuit is broken at the cut-out, even if the scale beam is in engagement with the contact terminal wire 54; consequently the armature is released from the magnet and flies back under the action of its springs, and pushes the latch forward again into the path of the downward movement of the valve's lock-lever. In case it is desired to open or close the rotary valve in the bottom of the hopper, and to set it at any desired part of its full discharging capacity, the finger disk is pulled back against its spring far enough to release its locking tooth 27, and the valve stem is turned in its chamber relative to the discharge aperture in the chamber, and independently of the tubular shaft to increase or diminish the area of the opening 8 in chamber 7. It is then again locked, with its tooth in one of the notches in the hub of the crank handle.

In Figs. 4 and 5, I have illustrated a device for preventing the clogging of material at the discharge end of the hopper, or for disintegrating lumpy sugar or like commodities, when my device is used for weighing such articles. This device consists in forming at the top of the chamber 7, and on each side thereof, a plurality of arms 58, which extend toward each other, to within a short distance of meeting. In the space between the ends of these arms, is located a shaft 59, which is journaled in the front and rear wall of the chamber 7, and upon this shaft is rigidly secured a plurality of hubs each having a plurality of arms or fingers 60, which are adapted to pass between the arms 58. Upon the rear end of this shaft, and outside of the casing, is secured a crank handle 61, by which the shaft is rotated to cause the fingers 60 to act in conjunction with the arms 58, for the purpose specified.

While I have illustrated the preferred construction and arrangement of my improved automatic weighing scales, I do not wish to be limited to the construction and arrangement herein shown and described, as many changes might be made without departing from the spirit of my invention.

My improved scale is simple in construction, accurate and sensitive in its weighing function, and is adapted to weigh sugar, rice, salt, and such other commodities as will flow easily from the hopper through the valve and discharge chute.

Having described my invention what I claim as new and desire to secure by Letters Patent is:

1. In a weighing machine, the combination of the casing, provided with a hopper and a weighing scale, of a chute extending from said hopper to said scale, a valve in the bottom of said hopper, means for manually opening and latching said valve, a spring arranged to effect said valve's closing movement, means including an electrically charged magnet for unlatching said valve whereby said spring is actuated to close said valve, and a plurality of gate valves in said chute adapted to control the passage-way through said chute.

2. In a weighing machine, the combination of the casing having a hopper, a weighing scale, and a discharging chute extending from said hopper to said scale, of a rotary valve and valve seat in said hopper, a partially rotative lever arranged to control said hopper valve, manual means for opening said valve through the medium of said lever, a latch for locking said lever in a position to hold said valve in an open position, and means including springs attached to said valve and an electrically operating magnet arranged to operate said latch to release said valve operating lever, a spring arranged to automatically close said valve when said lever locking latch is released by said magnet, means connected with said scale for operating said magnet at a point of its predetermined weighing movement, a plurality of gate valves in said chute, and means attached to said gate valves and to said hopper valve operating lever and including springs for opening and closing said gate valves synchronously with said hopper valve, as specified.

3. In an electrically controlled weighing machine, the combination with the casing, the hopper having a discharge aperture, a weighing scale in said casing, and a discharge spout leading from said hopper to said scale, of a semi-circular shaped valve seat in the discharge aperture of said hopper, a semi-circular-shaped valve rotatably mounted in said valve seat comprising a disk having a semi-circular curved plate integrally connected to and extending from it, and arranged to slidably fit the inner peripheral curve of said valve seat, and to control its discharge aperture, and means for manually rotating said valve to open it, a spring arranged to close said valve, and an electrically controlled operating bar actuated by said scale on the completion of its load.

4. In an electrically controlled weighing machine, the combination of the casing, the hopper, the discharge chute and an operative weighing scale, with the valve seat arranged in the discharge aperture of said hopper, the rotary valve, in said seat, the rotatable tubular shaft, the valve stem extending through said shaft, means for rotating said tubular shaft to open and close said valve, and means for adjusting said valve in its seat independent of the rotary movement of said tubular shaft.

5. In an electrically controlled weighing machine, the combination with the casing, the hopper, the discharge chute, and the weighing scale, of the valve seat in said hopper, the valve rotatably mounted in said valve seat, the tubular shaft, the valve stem extending through said shaft, the expansive spring on the end of said valve stem, a plurality of notches in the end of said tubular shaft, and a sliding knob on said stem provided with a pin adapted to fit said recesses and arranged to be held against and locked to the end of said tubular shaft by the expansive power of said spring.

6. In an electrically controlled weighing machine, the combination of the casing, the hopper, the discharge chute, and the scale, with the tubular valve seat, the rotary tubular shaped valve in said seat, the tubular shaft rotatably mounted in said casing, the spring on said valve stem, the finger knob slidably mounted on said stem and provided with a projecting pin, the notches in the end of said tubular shaft adapted to receive said pin, a crank handle secured to said tubular shaft, and means for defining the rotative movement of said handle and valve stem and valve to open and close said valve.

7. In an electrically controlled weighing machine, the combination with the casing, the hopper, the scale having a weighing beam, the discharge chute, and the rotary valve, and its valve stem, of a tubular shaft rotatably journaled in said casing, and surrounding said valve stem, means connected with said valve stem for releasably locking said valve stem, to said shaft, and for adjusting said valve relative to its seat independent of said tubular shaft, a crank handle for rotating said shaft and valve to open said valve, a stop secured in said casing for defining the rotative movement of said shaft and valve, a lock lever secured to said shaft and adapted to swing with it, a swinging hook latch pivoted and supported in the downward path of said lock lever and adapted to lock the same to hold the valve open, a magnet supported in said casing and connected to a source of electric current supply, a circuit wire arranged above the scale beam and connected to said magnet, a circuit wire connecting said scale, and the source of electrical supply, and springs arranged to move said lock lever and tubular shaft to close said valve.

8. In an electrically controlled weighing machine, the combination of the casing, the hopper, the discharge chute, the scale, the valve, the valve stem, the tubular shaft provided with a valve locking lever, and the manually operating crank, with a plurality of valves in said discharge chute comprising curved blades of metal fitting slidably between the sides of said chute, and a terminal edge adapted to bear closely against the bottom of said chute, and pivotally secured to the sides of said chute at their opposite edges, a right angled crank extension to the pivotal center of each of said valves, a lever connected to the far ends of said crank extensions of all of said valves, an adjustable rod pivotally connected at one end to said lever, and at its other end to said lock lever, a contraction spring connected at one end to the free end of said lock lever and secured at its opposite end to said casing.

9. In an electrically controlled weighing machine, the combination of the tubular shaft having a valve lock lever, the adjustable valve and stem, the discharge chute, the hopper, and the casing, the swinging valves pivoted in said chute, the crank stems on which said valves are supported, the connecting lever pivoted to said crank stem, the adjustable rod pivotally connected to said connecting lever, and to said lock lever, and contraction springs connected to said casing at one end and to said lock lever.

10. In an electrically controlled weighing machine, the combination of a suitable casing, a hopper therein, an operative scale in said casing, and a discharging chute extending from said hopper to said scale, an adjustable rotary valve in said hopper adapted to be manually operated to be opened, a plurality of valves in said discharge chute adapted to work synchronously with said hopper valve, and a lock lever connected to said hopper valve operating mechanism, with an operative electric circuit valve locking mechanism coöperatively connected to said scale, and consisting of a magnet connected to a source of current supply, having an armature operatively connected to a latch hook to move the same, said latch hook being positioned in the valve opening movement of said lock lever and adapted to lock and hold said lever when said valve is opened, and having said electrical current circuit arranged in the path of said scales weighing beam, said circuit being adapted to be closed by the upward moving contact of said beam's weighing movement with it, and operating to cause said magnet to attract said armature and thereby move said latch and release said lock lever, and means including springs for closing said hopper and discharge chute valves.

11. In an electrically operating weighing mechanism, the combination of the casing, the hopper, the discharge chute, the scales, tubular shaft, the lock lever, and the valve, said valve and lock lever and tubular shaft being adapted to be manually turned a predetermined distance to open and close said valve, with a bracket projecting inward from said casing adjacent to the path of said lock lever, a hooked latch pivoted at one end and having a hook at its opposite end positioned to be engaged and pushed back by the valve opening movement of said lock lever, a magnet secured to said casing adjacent to said latch, provided with a make-and-break armature, a rod connecting said latch to said armature to normally hold said latch in the paths of said lock lever when said armature is out of contact with said magnet, an electrical current wire connecting said magnet to the body of said scale, and an electric circuit contact terminal connected to said magnet and arranged in the upward path of the weighing beam of said scale, said circuit being adapted to be closed by the upward weighing movement of said scale's beam contacting with said magnet terminal contact, whereby said magnet attracts said armature and moves said latch to release said valve's lock lever, and springs arranged to move said lock lever and tubular shaft and said valve to close said valve.

In testimony whereof I affix my signature in presence of two witnesses.

OLIVER C. PATTON.

Witnesses:
G. SARGENT ELLIOTT,
ADELLA M. FOWLE.